United States Patent Office 3,224,978
Patented Dec. 21, 1965

3,224,978
TRITIUM ACTIVATED SELF-LUMINOUS
COMPOSITIONS
John G. MacHutchin and Donald B. Cowan, Berwick, and Ivor W. Allam, Bloomsburg, Pa., and William H. Byler, Morristown, N.J., assignors to United States Radium Corporation, Morristown, N.J., a corporation of Delaware
No Drawing. Filed Dec. 5, 1962, Ser. No. 242,358
9 Claims. (Cl. 252—301.1)

This application is a continuation-in-part of our copending application Serial No. 56,094, filed Sept. 15, 1960, now abandoned, and relates to an improved source of luminosity and, more particularly, to a tritium activated self-luminous composition. The invention is based on the discovery that inorganic phosphor particles intimately coated with a tritiated tung oil which, in turn, is coated with an inorganic siliciferous compound, are exceptionally resistant to degradation at tritiation levels far in excess of any known tritium-containing compounds.

Many organic and inorganic materials luminesce under external source of ionizing radiation, the luminescence being visible if the radiation is sufficiently intense. This property of luminescence has been employed in the production of luminous markers of various kinds, the most common example being the dials of watches. In general, watch dials are coated with a mixture of an inorganic phosphor and radium, which emits alpha particles which, in turn, collide with and excite the inorganic phosphor so that it luminesces and emits light. An identical phenomenon is exhibited when radium is mixed with zinc sulphide, which luminesces when excited by the ionizing radiation of radium. Radioactive strontium, which has recently become widely available, has also been mixed with inorganic phosphors of various types to provide artificial sources of luminosity.

These sources of luminosity possess certain inherent disadvantages which limit their effectiveness as light sources or standards. Mixtures of inorganic phosphor and radioactive strontium which emit beta radiation of high energy, and mixtures of phosphors and radium, which emit high energy nuclear radiation, are hazardous to personnel and require a considerable amount of shielding during the preparation, handling and use of the light source. Another disadvantage of presently available radium excited phosphors is that the luminosity diminishes at a rate of about 30 to 50 percent per year due to the destruction of the phosphor by densely ionizing particles. Consequently, the radium-activated phosphors or strontium-activated phosphors are not particularly suitable for use as a standard light source as may be required, for example, for the calibration of a light sensitive instrument.

Tritium ($H^3$) is particularly suitable as a radiation source for the excitation of inorganic phosphors because of its availability at relatively low cost, and the extremely low penetrating power of the beta radiation emitted by tritium. Because of this low penetration power, tritium may be used as a phosphor exciting agent with a minimum of shielding.

Substantial work has been done quite recently on the preparation of tritium activated self-luminous compounds, using tritiated fatty acids (such as stearic or linoleic acids) or tritiated polymer systems which are applied as thin coatings to an inorganic phosphor. Most of the tritiated compounds prepared previously suffer inherent limitations which makes their use either cumbersome, impractical, or very frequently inefficient. In many of these tritiated compounds, for example, the slow release of tritium gas and/or volatile tritiated organic materials necessitates internal special encapsulation to avoid radioactive contamination. Still others undergo such rapid rate of degradation that the degradation products produce a diminution in light output. Therefore, it is preferred to use a substantially non-volatile tritiated compound which is relatively stable to prevent radiation hazard.

Using a tritiated tung oil prepared by tritiating tung oil in the presence of a palladium-on-charcoal hydrogenation catalyst at room temperature and at sub-atmospheric pressure, we have found that it is possible to prepare a tritium activated self-luminous composition which is exceptionally resistant to degradation at tritiation levels far in excess of any known tritium-containing compounds by intimately coating inorganic phosphor particles with a thin layer of the tritiated tung oil. Moreover, we have also found that by depositing or precipitating (the terms are used interchangeably) a minor amount of an inorganic siliciferous compound or compounds on the coated phosphor, it is possible to improve the flow characteristics and the bonding of the tritiated tung oil to the individual phosphor particles. The outer siliciferous coating apparently forms a barrier layer around the phosphor particles coated with tritiated tung oil, thereby substantially reducing (and in some instances, preventing) $H^3$-H exchange which, in turn, results in a gradual diminution or lessening of the tritium content of the coated phosphor. Moreover, this barrier coating also appears to render the tritiated tung oil less susceptible to solvation by organic solvents in any binders or adhesives with which the compositions of the invention may be mixed, and to increase the resistance of the coated phosphor to discoloration upon exposure to ultraviolet light, as well as to maintain the particles separate and free-flowing, thus to enhance grading and mixing.

Based on these discoveries, the invention contemplates an improved tritium activated self-luminous composition comprising inorganic phosphor particles having an average particle size in the range from 6 to 30 microns intimately coated with a thin inner layer of a tritiated tung oil and a thin outer barrier layer of an inorganic siliciferous compound.

Any inorganic phosphor which is readily excited to fluorescence or phosphorescence by cathode rays may be used to prepare the tritium activated self-luminous compositions of the invention. Examples of these phosphors are silver-activated zinc sulfide; copper-activated zinc sulfide; silver-activated mixtures of zinc sulfide and cadmium sulfide; and manganese-activated zinc orthosilicate. The inorganic phosphor is suspended in an organic solvent, such as benzene, ethanol, acetone or diethyl ether, in which the appropriate quantity of tritiated tung oil of predetermined specific activity is dissolved. The mixture is then warmed to evaporate the solvent and leave a thin film of tritiated tung oil remaining on the phosphor crystal. A minor amount of an inorganic siliciferous compound (such as aluminum, barium, cadmium, calcium, magnesium, strontium, or zinc silicates, or various mixtures thereof), generally ranging from about 0.5 to about 3 percent by weight (based on the weight of the phosphor) may then be deposited onto the surface of the coated phosphor, using an aqueous solution of the inorganic siliciferous compound or a silica-containing aquasol or organosol to deposit or precipitate the inorganic siliciferous barrier layer.

The penetration distance for a maximum energy tritium β-ray (18 kilovolts) is 0.8 milligram per square centimeter, which is equivalent to a thickness of 0.008 millimeter of water or other material having a density of one gram per cubic centimeter. Only a small percentage (about 5 percent) of the β-rays emitted by tritium have energies higher than 15 kilovolts, and since the majority of the β-rays from tritium have energies between 5 and 7 kilovolts, it is evident that the tritiated coating on the phosphor must be very thin in order to avoid absorption of the emitted beta rays in the coating without the emission of photons. It has been estimated that for a coating thickness of 0.008 millimeter, only 10 percent of the energy of the tritium beta rays would be expended in the phosphor, the rest being absorbed in the tritiated organic coating compound. Consequently, in order to increase the efficiency of the tritium $\beta$-ray energy for light production, it is essential to make the coating thickness thinner than 0.008 millimeter. In general, then, if the thickness of the tritiated tung oil coating is maintained in the range from 0.0004 millimeter to 0.0008 millimeter, it will permit a possible efficiency utilization of from 63 to 80 percent of the $\beta$-ray energy emitted by the tritiated tung oil.

If a thinner deposit of tritiated tung oil is desired, it is necessary to use an increasingly higher specific activity tritiated tung oil (or one possessing larger number of millicuries of tritium per milligram of tritiated tung oil) in order to have a sufficient number of millicuries of tritium to give a desired brightness. Estimates of the theoretical maximum brightness obtainable from one millicurie of tritium give a value of 1.8 microlamberts over an area of one square centimeter for a phosphor emitting 5200 A. wave length light (that wave length to which the adapted eye is most sensitive in the dark). Consequently, if a light source having a brightness of 20 microlamberts and an area of 1 square centimeter is desired, 11 millicuries of tritium are required, assuming the efficiency to be theoretical. Since the weight of phosphor is 2 milligrams for the optimum thickness of 2 milligrams per square centimeter, the weight of tritiated tung oil to be used is about 0.2 milligram. Thus, the specific activity of the tritiated tung oil must be at least 11 millicuries in 0.2 milligram or 55 curies per gram. In actual practice, however, the efficiency is less than theoretical, so that even higher specific activities are required to increase the brightness. Lower specific activities can be used with thicker coatings, but this may only be done at the expense of reduced efficiency and hence greater tritium consumption.

After the phosphor particles have been coated with tritiated tung oil, the inorganic siliciferous barrier layer may be applied by precipitating an inorganic silicate (such as the aforementioned aluminum, barium, cadmium, calcium, magnesium, strontium and zinc silicates) onto the coated phosphor particles from an aqueous solution or dispersion of such silicate, the object being to encapsulate each coated phosphor particle with a barrier layer of the silicate. To avoid excessive tritium losses during precipitation of the silicate barrier layer, both the quantity of water in the silicate solution and the length of time during which the coated phosphor particles are in contact with this solution should, of course, be kept to a minimum. Advantageously, a wetting agent or surfactant, such as sodium lauryl sulfonate or the sodium salt of sulfonated ethyl stearate, may be used to facilitate wetting each coated phosphor particle with the silicate solution or dispersion.

Instead of employing an aqueous solution or dispersion of an inorganic silicate to form the outer barrier layer, the tritiated tung oil-coated phosphor particles may be further coated with a silica aquasol or a silica organosol, the former being commercially available under the trademark "Ludox" from E. I. du Pont de Nemours & Company. When a silica aquasol is employed, it should contain a surfactant, such as a cationic surfactant (e.g., "Duomeen"), to facilitate wetting the coated phosphor particles. After the aqueous solution or dispersion of the inorganic silicate or the silica aquasol or organosol is admixed with the tritiated tung oil-coated phosphor particles, the outer barrier layer may be formed quite easily by evaporating the solvent or solvents from the system to dryness.

The following examples are illustrative of the ease with which the tritium activated self-luminous compositions of the invention may be prepared:

Example I

A calculated amount of tung oil, e.g. 1 gram, is placed in a stainless steel reaction vessel along with 0.01 gram of 5 to 10 percent palladium-on-charcoal hydrogenation catalyst and the reaction mixture diluted with anhydrous ethanol. The mixture is then frozen in a liquid nitrogen bath, and any residual gas in the reaction vessel removed by applying a vacuum. Carrier-free $H^3$ gas is then introduced in a calculated amount but at less than atmospheric pressure. The reaction mixture is allowed to warm to room temperature and agitated until the tritiation is complete. Following completion of the reaction, the reaction mixture is refrozen and any unreacted $H^3$ gas, if present, is removed under vacuum. The reaction mixture is allowed to warm to room temperature, and then is filtered in special metal pressure filter capable of removing catalyst particles of $\frac{1}{50}$ micron size or larger. The filter cake is then washed with benzene, and the combined filtrates vacuum distilled at room temperature to remove solvents and any residual volatiles, leaving a tritiated tung oil. The tritiated compound is immediately dissolved in a cyclic organic solvent, preferably benzene, and may be used without further purification to prepare the tritium activated self-luminous compositions of the invention.

Example II

To prepare the improved tritium activated self-luminous composition of the invention, the following preferred procedure has been found to be the most desirable:

The required weight of phosphor, preferably one of low cadmium content with no treatment to improve flow characteristics, and with average particle size range between 6 and 30 microns (although it may range between 1 to 30 microns) is placed in a ceramic dish, and a calculated quantity of the benzene solution of tritiated tung oil prepared in accordance with Example I then added to the phosphor particles. After evaporation of the benzene at a temperature slightly below boiling point, with constant stirring of the mixture, the tritiated tung oil coated phosphor is then slurried in an aqueous solution of calcium or zinc nitrate of such concentration that when a dilute solution of sodium meta silicate is added to the mixture, a coating of from 0.5 to 3 percent by weight (based on the weight of phosphor) of calcium or zinc silicate deposits on the phosphor crystals. The resultant slurry is stirred, filtered, and washed with a water-ethanol solvent pair (2:1) and then dried. The dried powder is then screened through a 250 mesh screen, resulting in a free flowing, calcium or zinc silicate-coated, tritium activated self-luminous composition having excellent handling properties and in which the radioactive moiety is uniquely resistant to removal by organic solvents.

Although the foregoing example of the invention illustrates the use of calcium or zinc silicate to form the outer barrier layer, excellent results may also be obtained when other inorganic silicates or even silica aquasols or organosols are employed to further coat the phosphor particles. Tritium activated self-luminous compositions produced in accordance with the invention are exceptionally resistant to degradation and to discoloration under ultra-violet light. Moreover, they possess free-flowing properties, and may be stored over long periods of time without any significant loss in their light intensity. They may be used in the form of a powder or dispersed in a binder and then applied to a surface.

We claim:

1. A tritium activated self-luminous composition comprising inorganic phosphor particles having an average particle size in the range from 6 to 30 microns intimately coated with a thin inner layer of a substantially non-volatile tritiated compound on which there is deposited a minor amount of a thin outer barrier layer of an inorganic siliciferous compound selected from the group consisting of silica, aluminum silicate, barium silicate, cadmium silicate, calcium silicate, magnesium silicate, strontium silicate, and zinc silicate.

2. A tritium activated self-luminous composition comprising inorganic phosphor particles having a particle size in the range from 6 to 30 microns intimately coated with a thin inner layer of a substantially non-volatile tritiated compound on which there is deposited from about 0.5 to about 3 percent by weight of a thin outer barrier layer of an inorganic siliciferous compound selected from the group consisting of silica, aluminum silicate, barium silicate, cadmium silicate, calcium silicate, magnesium silicate, strontium silicate, and zinc silicate, the percent by weight of the inorganic siliciferous compound based on the weight of the inorganic phosphor particles.

3. A tritium activated self-luminous composition comprising inorganic phosphor particles having an average particle size in the range from 6 to 30 microns intimately coated with a thin inner layer of a tritiated tung oil on which there is deposited from about 0.5 to about 3 percent by weight of a thin outer barrier layer of an inorganic siliciferous compound selected from the group consisting of silica, aluminum silicate, barium silicate, cadmium silicate, calcium silicate, magnesium silicate, strontium silicate, and zinc silicate, the percent by weight of the inorganic siliciferous compound being based on the weight of the inorganic prosphor particles, the thickness of the coating of the tritiated tung oil on the individual phosphor particles being in the range from about 0.0004 millimeter to about 0.0008 millimeter, the specific activity of the tritiated tung oil being selected to produce the desired luminosity.

4. A tritium activated self-luminous composition according to claim 3, in which the thin outer barrier layer is formed from calcium silicate.

5. A tritium activated self-luminous composition according to claim 3, in which the thin outer barrier layer is formed from zinc silicate.

6. A process for producing a tritium activated self-luminous composition which comprises intimately coating inorganic phosphor particles with a substantially non-volatile tritiated compound, precipitating a minor amount of an inorganic siliciferous compound selected from the group consisting of silica, aluminum silicate, barium silicate, cadmium silicate, calcium silicate, magnesium silicate, strontium silicate, and zinc silicate on the coated phosphor particles, and then drying and screening the resultant tritium activated self-luminous composition.

7. A process for producing a tritium activated self-luminous composition which comprises intimately coating inorganic phosphor particles with a substantially non-volatile tritiated compound, precipitating from about 0.5 to about 3 percent by weight of an inorganic siliciferous compound selected from the group consisting of silica, aluminum silicate, barium silicate, cadmium silicate, calcium silicate, magnesium silicate, strontium silicate, and zinc silicate on the coated phosphor particles, the percent by weight of the inorganic siliciferous compound being based on the weight of the phosphor particles, and then drying and screening the resultant tritium activated self-luminous composition.

8. A process for producing a tritium activated self-luminous composition which comprises intimately coating inorganic phosphor particles having an average particle size in the range from 6 to 30 microns with a thin layer of a tritiated tung oil, precipitating from about 0.5 to about 3 percent by weight of an inorganic siliciferous compound selected from the group consisting of silica, aluminum silicate, barium silicate, cadmium silicate, calcium silicate, magnesium silicate, strontium silicate, and zinc silicate, on the coated phosphor particles, the percent by weight of the inorganic siliciferous compound being based on the weight of the phosphor particles, and then drying and screening the resultant tritium activated self-luminous composition.

9. A process for producing a tritium activated self-luminous composition which comprises intimately coating inorganic phosphor particles having an average particle size in the range from 6 to 30 microns with a layer of a tritiated tung oil to a coating thickness of a tritiated tung oil on the individual phosphor particles in the range from about 0.0004 millimeter to about 0.0008 millimeter, precipitating from about 0.5 to about 3 percent by weight of an inorganic siliciferous compound selected from the group consisting of silica, aluminum silicate, barium silicate, cadmium silicate, calcium silicate, magnesium silicate, strontium silicate, and zinc silicate, on the coated phosphor particles, the percent by weight of the inorganic siliciferous compound being based on the weight of the phosphor particles, and then drying and screening the resultant tritium activated self-luminous composition.

No references cited.

CARL D. QUARFORTH, *Primary Examiner.*